(12) United States Patent
Solazzo (10) Patent No.: US 9,493,053 B2
(45) Date of Patent: Nov. 15, 2016

(54) VENTILATION BOX FOR ACTUATORS

(71) Applicant: ROECHLING AUTOMOTIVE AG & CO. KG, Mannheim (DE)

(72) Inventor: Domenico Solazzo, Worms (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 660 days.

(21) Appl. No.: 13/950,498

(22) Filed: Jul. 25, 2013

(65) Prior Publication Data
US 2014/0038508 A1 Feb. 6, 2014

(30) Foreign Application Priority Data

Aug. 3, 2012 (DE) .......................... 10 2012 213 827

(51) Int. Cl.
*B60H 1/26* (2006.01)
*B60H 1/00* (2006.01)
*F24F 13/14* (2006.01)

(52) U.S. Cl.
CPC ............ *B60H 1/26* (2013.01); *B60H 1/00435* (2013.01); *B60H 1/00857* (2013.01); *F24F 13/1406* (2013.01); *F24F 13/1426* (2013.01)

(58) Field of Classification Search
CPC B60H 1/00435; B60H 1/00857; B60H 1/26; F24F 13/1406; F24F 13/1426; F24F 13/20; F24F 13/22; F24F 2011/0052; F24F 2011/0056; F24F 2011/0067; F24F 2013/1433; A62C 2/247; F16K 1/223; F16K 31/05; H05K 7/00

USPC .................................................. 454/147, 184
See application file for complete search history.

(56) References Cited

U.S. PATENT DOCUMENTS

| 5,875,632 A | 3/1999 | Kappel |
| 2004/0145259 A1 | 7/2004 | Wysk |
| 2011/0030342 A1 | 2/2011 | Herges |
| 2012/0043146 A1 | 2/2012 | Schneider |

FOREIGN PATENT DOCUMENTS

| DE | 33 47 363 A1 | 7/1985 |
| DE | 103 31 938 A1 | 3/2005 |
| DE | 10 2008 029 276 A1 | 12/2009 |

*Primary Examiner* — Steven B McAllister
*Assistant Examiner* — Reginald McNeill, II
(74) *Attorney, Agent, or Firm* — Rothwell, Figg, Ernst & Manbeck, P.C.

(57) ABSTRACT

An air damper drive for adjusting at least one air damper, which is provided on a frame, between at least two different relative positions including an actuator having an actuator casing and a movement output member received therein, and further including a duct which is coupled in liquid-tight manner to the actuator and extends along a duct path (K) and has a duct sheath and a duct volume surrounded by the latter, wherein the duct sheath is coupled to the actuator casing in liquid-tight manner such that the duct volume communicates with an actuator inner volume that is surrounded by the actuator casing, and in that the air damper drive has an equalization casing to which the duct sheath is connected in liquid-tight manner such that the duct volume communicates with an equalization volume that is surrounded by the equalization casing.

15 Claims, 5 Drawing Sheets

VENTILATION BOX FOR ACTUATORS

CROSS REFERENCE TO RELATED APPLICATION

This application claims the benefit of German Patent Application No. 10 2012 213 827.7 filed on Aug. 3, 2012, the disclosure of which is incorporated herein in its entirety by reference.

The present invention relates to an air damper drive for adjusting at least one air damper, which is provided on a frame such that it is movable in relation thereto, between at least two different relative positions, in particular in a motor vehicle, including an actuator having an actuator casing and a movement output member received therein, and further including a duct which is coupled or may be coupled in liquid-tight manner to the actuator and extends along a duct path and has a duct sheath and a duct volume surrounded by the latter.

Air dampers—which may also be termed air flaps—such as that mentioned above, for the adjustment whereof the air damper drive discussed here is suitable, are primarily known in the motor vehicle sector for altering a flow of a quantity of cooling air to a unit lying downstream of the air damper, as seen in the direction of cooling air flow, by adjusting the air damper(s).

Because air dampers of this kind and their drives are frequently arranged in the front region of a motor vehicle, during operation the air damper drives are exposed to environmental influences that put operation at risk, such as sprayed water and dirt. The actuator and the duct that is typically used in the prior art to transmit drive energy and/or operating signals to the actuator are thus typically constructed to be liquid-tight and may also be coupled to one another in liquid-tight manner.

However, during operation of the actuator the temperature thereof increases as a result of heat dissipation, which also increases the temperature and, associated therewith, the pressure of the gas in the actuator casing, which is typically air.

Because the duct and the actuator casing are frequently coupled detachably to one another, for example by a plug and socket connection, the coupling may be liquid-tight but in many cases it is not gas-tight. For this reason, air from the actuator inner volume, which in operation is at the high pressure described above, may escape from the system formed by the actuator casing and the duct.

Consequently, when the actuator cools during phases of relatively long periods of rest from operation, a negative pressure—in relation to the ambient atmospheric pressure—is produced in the actuator inner volume, with the result that air typically flows along the same paths, out of the surrounding environment and into the actuator casing.

Should the system formed by the actuator casing and the duct coupled thereto be temporarily soiled and dirt and/or sprayed water adhere at the coupling point, then in the cooling phase, driven by the difference in pressure brought about by cooling of the actuator, the dirt adhering to the outside and/or the sprayed water may enter the actuator inner volume and damage the electronics and/or mechanical equipment there.

The above-mentioned liquid tightness of the coupling between the duct and the actuator casing is a liquid tightness that prevails if the difference in pressure between the actuator inner volume and the ambient atmosphere does not exceed that of a water column of one meter. However, liquid tightness during phases in which the actuator cools after operation cannot necessarily be guaranteed, because of the great differences in pressure that may then arise.

It is thus the object of the present invention to further develop an air damper drive of the type mentioned at the outset such that the problem of dirt and/or sprayed water entering the actuator casing from the outside as a result of a difference in gas pressure is reduced or even entirely eliminated. In other words, the liquid tightness of the air damper drive is to be improved.

According to the invention, this object is achieved by a generic air damper drive in which the duct sheath is coupled or may be coupled to the actuator casing in liquid-tight manner such that the duct volume communicates with an actuator inner volume that is surrounded by the actuator casing, and in that the air damper drive has an equalisation casing to which the duct sheath is connected or may be connected in liquid-tight manner such that the duct volume communicates with an equalisation volume that is surrounded by the equalisation casing, such that the duct connects the actuator inner volume and the equalisation volume by fluid mechanics.

This measure increases the gas volume enclosed by the air damper drive by the amount of the equalisation volume. This simple measure has the result that the liquid-tight system which is now formed by the actuator casing, the duct and the equalisation casing has available an air mass which is larger than that of the prior art and heats up to a correspondingly smaller extent during equivalent operation of the actuator. As a result of the consequently smaller rise in temperature by comparison with the rest temperature of the air damper drive, the rise in pressure in the actuator inner volume, the duct volume and the equalisation volume may be reduced. In this way, during operation and in the cooling phase the pressure difference prevailing between the overall inner volume and the ambient atmosphere may be reduced by a corresponding amount. This consequently brings about an appreciable reduction in the risk of dirt and/or sprayed water entering the actuator casing.

To prevent a critical pressure difference being achieved between the gas in the overall volume comprising the actuator inner volume, the duct volume and the equalisation volume on the one hand and the ambient atmosphere on the other, which could still be possible despite the provision of the equalisation casing if the actuator is operated for a particularly long period, it may preferably be provided for the equalisation casing to have an equalisation opening that is covered by a gas-permeable but liquid-impermeable material, in particular textile. As a result of the equalisation opening, which is covered as described, gas exchange may take place between the overall inner volume and the ambient atmosphere without moisture, let alone dirt, being able to penetrate into the overall inner volume. The gas-permeable but liquid-impermeable material may for example be a functional textile which although being breathable is a barrier to liquid.

Where materials, for example functional textiles, are used that are gas-permeable in only one direction but are gas-impermeable in the opposite direction, a plurality of equalisation openings may also be provided, of which at least one is covered by liquid-permeable but gas-impermeable material such that the gas can escape from the equalisation volume into the ambient atmosphere, and of which at least a further one is covered by gas-permeable but liquid-impermeable material such that the gas can flow out of the ambient atmosphere and into the equalisation volume.

Although pressure is not equalised instantaneously, because of the flow resistance provided by the covering material, with the proposed further development of the present invention a rise in pressure and a fall in pressure, in relation to the ambient atmosphere, in the equalisation volume and hence in the volumes that communicate with it by fluid mechanics—the duct volume and the actuator inner volume—may be limited such that the risk of dirt and/or sprayed water being drawn by suction in critical manner into the actuator casing may be ruled out to a level of probability almost bordering on certainty.

To enable hot gas, in particular, in the overall inner volume to be able to escape therefrom particularly quickly without an excessively high pressure building up, according to a further development of the present invention it may be provided for the air damper drive, in particular the equalisation casing, to have an overpressure valve which opens if a predetermined threshold pressure difference between an ambient atmospheric pressure outside the equalisation casing and an operating pressure in the equalisation volume is exceeded, and which closes if the pressure difference between the ambient atmospheric pressure and the operating pressure in the equalisation volume is smaller than the threshold pressure difference. Typically, in fact, the cooling process after an operating phase is slower than the heating phase during actuator operation, with the result that a negative pressure which may occur in the overall inner volume once an operating phase is at an end may always be relieved sufficiently quickly by the above-mentioned equalisation opening.

Even though the liquid tightness of the air damper drive is improved by the measures proposed above, liquid can still enter the interior of the air damper drive, for example in the form of water condensate. This water condensate can then be discharged from the air damper drive if the overpressure valve is provided at the geodetically lowest point of the equalisation casing. In that case, in fact, the water condensate collects at the overpressure valve because it flows to the geodetically lowest point, driven by the force of gravity. If the overpressure valve is then opened during an operating phase, as well as the gas at overpressure in the equalisation volume any liquid present at the valve will be ejected as well without having the opportunity to come back into the equalisation volume.

In the simplest case, it is conceivable for the duct sheath to be a hose containing a gas, in particular air. For example, the duct sheath may contain exclusively gas, in particular air, as is the case in a conventional air hose.

However, for functional equalisation of the pressure of gas in the actuator inner volume and the equalisation volume, it is not necessary for the duct sheath to be filled exclusively with gas. Thus, an electrically conductive material may for example be received in the duct volume, for example in the form of metal wire strands, as is the case with electrical lines. Preferably, there may then serve as the above-mentioned hose an electrical insulation which is in any case usually provided on electrical lines. In this case, a conventional insulated stranded wire may be used as the pressure-equalising duct that is connected by fluid mechanics, since typically when stranded wires are used the volume surrounded by the electrical insulation is not completely filled with wire strands but spaces are left between them through which gas can flow.

If the duct has no function other than to create a fluid-mechanics communication between the equalisation volume and the actuator inner volume, the duct may end at or in the equalisation casing. This is in particular true of the above-mentioned sheath filled exclusively with gas.

However, in particular if the duct is an electrical line for which the creation of a fluid-mechanics communication between the equalisation volume and the actuator inner volume is more of a secondary function by comparison with its transmission of energy and/or signals, it may be provided for the duct to pass through the equalisation casing, wherein both the point at which the duct enters the equalisation casing and the point at which the duct exits from the equalisation casing are sealed from the surrounding environment in liquid-tight manner, and wherein further the duct sheath has in the interior of the equalisation casing a breach passing through it. Here, the breach passes through the duct sheath in the direction of its thickness, with the result that the breach for its part creates a fluid-mechanics communication between the duct volume and the equalisation volume.

Even though an electrical line, for example in the form of the above-mentioned stranded wire, is sufficient to implement the present invention, the desired pressure equalisation between the actuator inner volume and the equalisation volume sometimes takes place slowly using a single electrical line. The rate of pressure equalisation may be increased if the air damper drive has a plurality of electrical lines, each of which is provided with insulation. In this case, a plurality of the electrical lines or indeed all of them may take the form mentioned above, that is to say pass through the equalisation casing and have a breach passing through the electrical insulation in the direction of thickness. To prevent the electrical lines from coming into contact with one another at the breach passing through them and hence short circuiting in undesirable manner, according to a further development of the present invention it is conceivable to provide spacers in the interior of the equalisation casing, which keep the electrical lines provided with a breach spaced from another.

In the context of the present application, a breach passing through the duct sheath or the electrical insulation may also be an electrical line which in certain sections has had the insulation completely removed. In this case, the breach runs around the entire electrical line in the peripheral direction.

For a simplified arrangement of the plurality of electrical lines, it may be provided for these to be received in a common cladding that surrounds the lines. The cladding, too, may then pass through the equalisation casing, in which case the individual electrical lines which take part in pressure equalisation, that is to say in the fluid-mechanics connection, between the actuator inner volume and the equalisation volume, are preferably guided out of the cladding within the interior of the equalisation casing in order to have their breach exposed directly in the equalisation volume.

As a further means of facilitating assembly, it may be provided for the plurality of electrical lines to be coupled by means of a common electrical plug to a corresponding socket on the actuator casing. In this case, the socket on the actuator casing may be provided in the region of the electrical contacts passing through it and/or at a point arranged spaced from the electrical contacts with a breach passing through the actuator casing wall, through which pressure equalisation may take place between the actuator inner volume and the duct volume.

The electrical lines are typically needed to transmit energy and/or control signals to the actuator. It is frequently the case here that the socket has more electrical contacts than are necessary for operation of the air damper drive, for adjusting at least one air damper relative to the frame carrying it. In this case a duct which leads to the unnecessary electrical contact, and the duct sheath thereof, may be used to make the fluid-mechanics connection between the actuator inner volume and the equalisation volume. Because neither signals nor energy have to be transmitted to the unnecessary electrical contact, a duct sheath that is filled exclusively with gas may be coupled to it. In this case, it is further preferable if a breach is provided in the socket, in the vicinity or directly on the unnecessary electrical contact, as a gas passage opening, in order to keep the flow resistance between the actuator inner volume, the duct coupled to the unnecessary electrical contact and the equalisation volume as low as possible.

An air damper drive as described above may be part of an air damper device which moreover has a frame and at least one air damper which is provided on the frame movably in relation thereto. It is advantageous from a manufacturing engineering point of view that the frame may be used as the assembly location for the equalisation casing, although this is not mandatory. However, usually a frame of an air damper device provides a sufficiently large assembly surface for the equalisation casing described here. In a case which is particularly advantageous because the number of component parts involved is reduced, it may furthermore be conceivable for a section of the frame to be part of the equalisation casing. In this way, a wall of the equalisation casing may be made in one piece with the frame.

In order to avoid heat being transmitted directly between the actuator and the equalisation casing, the equalisation casing may advantageously be provided at a spacing from the actuator of a number of cm, in particular a number of tens of cm.

As mentioned at the outset, the air damper drive described above, in particular the air damper device described above, may be provided on a motor vehicle. The equalisation casing may then be mounted directly on a motor vehicle part and need not be provided on a frame of the air damper device. Although the use of a frame section as part of the equalisation casing does in particular make it easier to manufacture and assemble the air damper device discussed here, mounting the equalisation casing on a motor vehicle part other than the frame means that an even greater distance between the equalisation casing and the actuator is possible, which reduces direct heat transfer, apart from the convection which is desirable throughout the inner volume.

In the coupled state, the actuator casing, the equalisation casing and the duct which connects the inner volumes thereof by fluid mechanics form a liquid-tight sheath for the air damper drive according to the invention.

The present invention will be explained in more detail below with reference to the attached drawings, in which.

Figure 1:
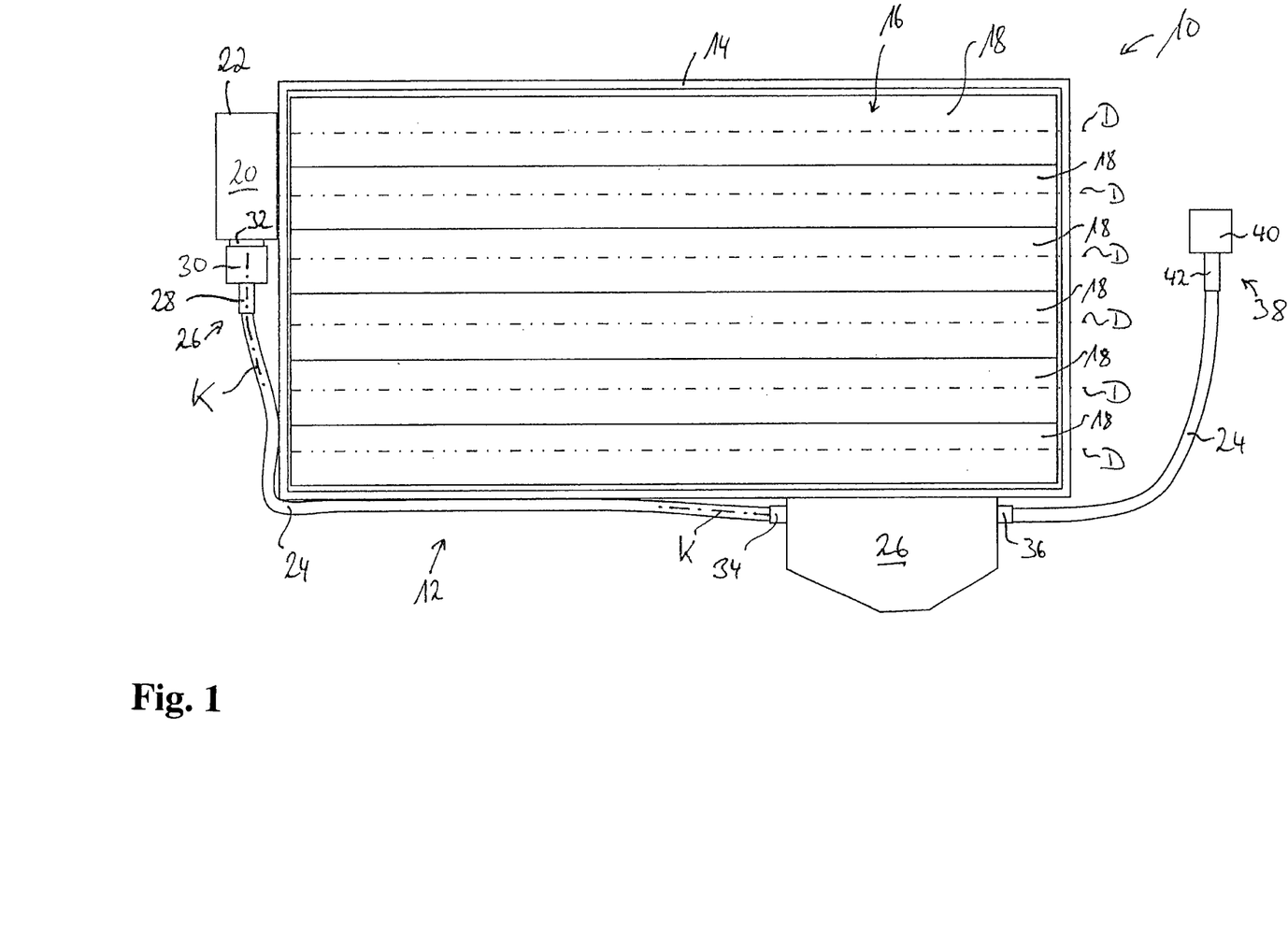
FIG. 1 shows a highly schematic plan view of a first embodiment according to the invention of an air damper device having an air damper drive of the present application.

FIG. 1 shows a first embodiment of an air damper device, which is generally designated 10. The air damper device 10 includes an air damper drive 12 and a frame 14, which in the assembled state is conventionally arranged in a fixed position, for example fixed to the body of a motor vehicle.

The frame 14 defines and surrounds a passage opening 16. In the interior of the frame 14, that is to say in the region of the passage opening 16, there is arranged on the frame 14 and movable in relation thereto at least one air damper 18, in the example illustrated precisely six air dampers 18 but in principle also any plurality of air dampers 18. The air dampers 18 are provided on the frame 14 such that they are adjustable in relation to the frame 14, for example being rotatable about axes of rotation D, for changing the cross-section of the passage opening 16 through which flow may pass.

Preferably, the axes of rotation D of the air dampers 18 are parallel to one another, so that for relative adjustment it is sufficient to drive only one air damper 18 directly and to derive the movement of the other air dampers 18 indirectly from the directly driven air damper 18, as may be implemented in a manner known per se using linkages and/or gears.

The air damper drive 12, which is provided for adjustment of the air dampers 18 between at least two different relative positions in relation to the frame 14, includes an actuator 20 having an actuator casing 22. The actuator 20 has a movement output member, which is not illustrated but is known per se, such as an output shaft or piston rod or similar, which is coupled or may be coupled to a movement input part of an air damper 18 for transmitting movement. In the present, first exemplary embodiment, this is assumed to be an electric actuator 20 in the form of an electric motor having a rotating output shaft.

The air damper drive 12 further has a duct 24 which extends along a duct path K from the actuator casing 22 to an equalisation casing 26.

Figure 2:
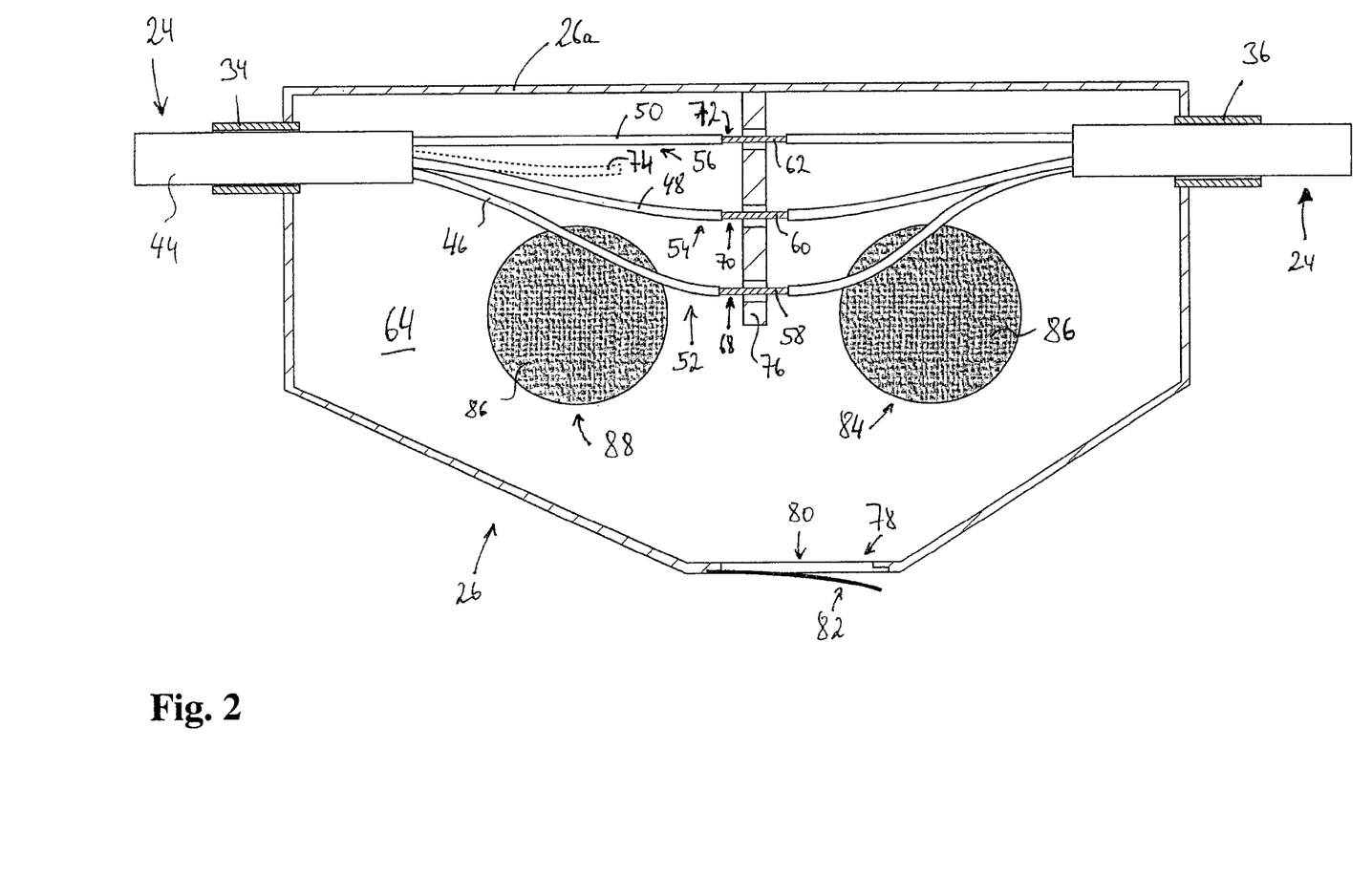
FIG. 2 shows a highly schematic cross-sectional view through the equalisation casing of the air damper drive in FIG. 1.

In the present, first exemplary embodiment of FIGS. 1 and 2, the duct 24 may pass through the equalisation casing 26.

At its longitudinal end 26 facing the actuator 20 and intended to be coupled thereto, the duct 24 is connected in liquid-tight manner by way of a bushing 28 to a plug 30 which may be coupled to a socket 32 on the actuator casing 22. The plug 30 and socket 32 are, for their part, matched to one another in their construction in a manner known per se such that when it is made correctly the connection between the plug 30 and the socket 32 is liquid-tight.

In the context of the present application, the property of liquid tightness means that a liquid-tight connection may be immersed in water to a depth of up to a meter without the water pressure acting in this way on the connection causing water to penetrate through the connection.

Thus, the actuator 20 is connected in liquid-tight manner to the duct 24 by way of its socket 32, the plug 30 and the bushing 28.

Similarly, the point at which the duct 24 enters the equalisation casing 26 through a bushing 34 is constructed to be liquid-tight in a manner known per se. The same applies to the point at which the duct 24 exits from the equalisation casing 26, and to the bushing 36 used to create its liquid tightness.

At its longitudinal end 38 remote from the actuator 20, the duct 24 may once again be connected to a plug 40, in this case too it being possible for a bushing 42 to be arranged in between in order to connect the duct 24 to the plug 40 in liquid-tight manner. The plug 40 may be constructed like the socket 30 at the other end 26 of the duct 24, or it may also be constructed differently therefrom. It serves to provide a coupling with an energy and/or signal supply, such as an onboard computer of a motor vehicle.

The actuator casing 22 is preferably constructed to be liquid-tight in order to prevent liquid or even dirt from entering the interior of the actuator casing 22 where dirt or liquid could result in damage to the actuator 20.

In operating phases of the actuator 20, the latter acts as a heat source because of its energy conversion, which entails losses, as a result of which the temperature and consequently also the pressure of the gas in the actuator casing 22—typically air—increases.

In the case of air damper drives of the prior art, a pressure increase of this kind in the interior of the actuator casing can result in air being blown out through seal gaps, such as between the socket 32 and the plug 30 or between the bushing 28 and the duct 24. As a result, the gas pressure in the interior of the actuator 20 and also in the duct 24 is relieved, or the increase in pressure is slowed down.

However, when the actuator 20 cools down again in the phases of rest between operations, a negative pressure of the gas in the interior of the actuator casing 22 may arise there in relation to the pressure of the ambient atmosphere, which can result in a larger pressure difference at the abovementioned sealing gaps serving for blowing out than the above limit pressure difference achievable by a water column of one meter. The consequence is that liquid or even dirt may be drawn by suction into the actuator casing interior.

To reduce or even avoid this effect, according to the invention the equalisation casing 26 is provided. This is illustrated in a first embodiment in cross section in FIG. 2.

In the present example, the duct 24 may include a cladding 44, for example in the form of a fire-resistant woven hose, in which a plurality of duct sheaths 46, 48 and 50 may be guided. The duct sheaths 46, 48 and 50 may be insulation for an electrical line 52, 54 and 56, in which metal stranded wires 58, 60 and 62 may be guided in the interior of the inwardly hollow duct sheaths 46, 48 and 50.

Figure 5:
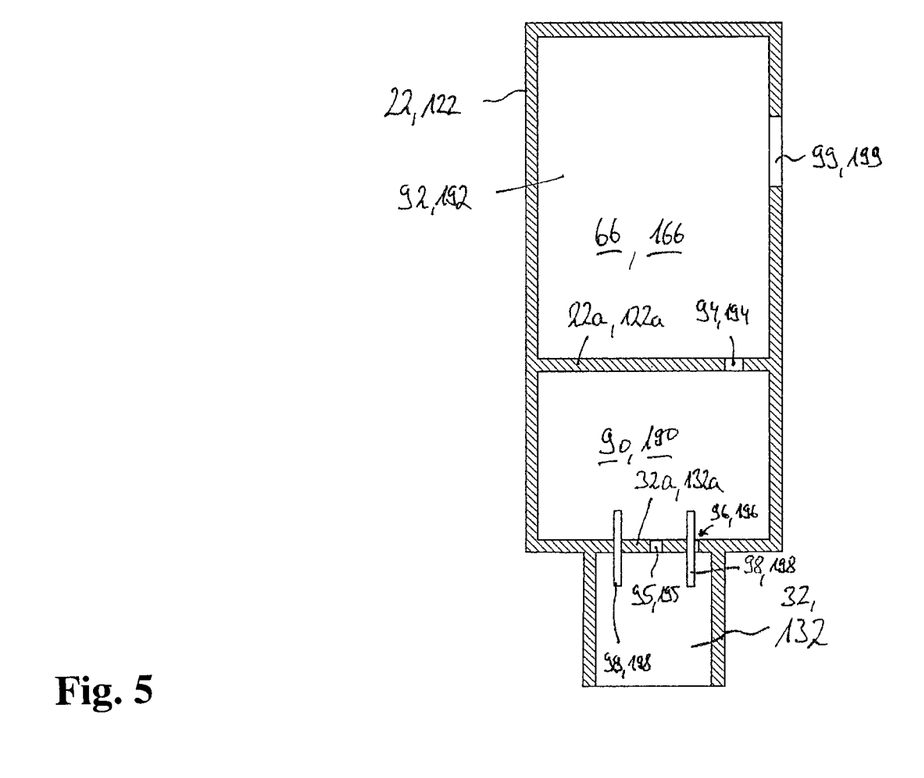
FIG. 5 shows a highly schematic view of a longitudinal section through the actuator casing of the embodiments in FIGS. 1 and 3.

The duct sheaths 46, 48 and 50 are constructed such that, in addition to the metal stranded wires 58, 60 and 62, there is also gas surrounded by the duct sheaths 46, 48 and 50, with the result that the latter may serve as gas lines through which a fluid-mechanical connection may be made between the equalisation volume 64 in the interior of the equalisation casing 26 and the actuator inner volume 66 (see FIG. 5).

To make a fluid-mechanical connection between the actuator inner volume 66 and the equalisation volume 64, the duct sheaths 46 and/or 48 and/or 50 may have breaches 68, 70 and 72 passing through them, which pass entirely through the duct sheaths towards the duct volume surrounded by the (unaffected) duct. In the present example of FIG. 2, a breach may also be formed by completely removing the insulation from the electrical lines 52, 54 and 56 in certain regions.

Thus, a gas volume is provided which is uninterrupted and extends through the actuator inner volume 66, the volume surrounded by the plug 30 and the socket 32, to the gas volume in the duct sheaths 46, 48 and 50 as far as and including the equalisation volume 64. In addition, the cladding 44 may also be used as a duct providing a fluid-mechanics connection if it is itself liquid-tight.

If there is sufficient space in the cladding 44 of the duct 24, a hose 74 which is filled exclusively with gas may be received in the cladding 44 in addition to the electrical lines 52, 54 and 56, this hose 74 being illustrated in dotted lines in FIG. 2 because it is optional in nature.

The hose 74 may for example be formed by a continuously hollow hose. The hose 74 may also be introduced with the cladding 44 into the equalisation volume 64 as an alternative to the electrical lines 52, 54 and 56.

In order to avoid an undesirable electrical contact with the sections of the electrical lines 52, 54 and 56 from which the insulation has been removed, there may be provided in the interior of the equalisation casing 26 a partition element 76, for example made from plastics or another electrically non-conductive material, which has openings provided at a spacing from one another, through which the electrical lines 52, 54 and 56, in particular the sections from which the insulation has been removed in forming the breaches 68, 70 and 72, may pass. As a result of the partition element 76 the electrical lines 52, 54 and 56 are forcibly kept physically spaced in the interior of the equalisation casing 26.

The equalisation casing 26 may have a location 78 at the geodetically lowest point, in the assembled state, at which a valve opening 80 having an overpressure valve 82 may be provided. The overpressure valve 82 is in the present example in the form of a leaf spring valve which opens outwards in relation to the equalisation volume 64 and in which a leaf spring element acting as the valve element keeps the valve opening 80 closed as long as a pressure difference between the gas pressure in the equalisation volume 64 and the ambient atmosphere surrounding the equalisation casing 26 does not exceed a predetermined threshold pressure difference. The threshold pressure difference may be set as a result of the dimensions and material properties of the valve body, that is to say in the present case the leaf spring valve element.

If liquid collects unexpectedly in the equalisation casing 26, whether as a result of undesirable moisture entering the equalisation casing 26 or as a result of condensation and the precipitation of moisture on the inner walls of the equalisation casing 26, then it will run down to the geodetically lowest point 78 in the equalisation casing 26 and, should there be a sufficiently large pressure difference, be emitted to the ambient atmosphere outside through the overpressure valve 82.

Further, a first equalisation opening 84 which is covered by a gas-permeable but liquid-impermeable material 86 may be provided in a wall in the equalisation casing 26. A material of this kind may be for example a functional textile, as is known from Gore-Tex® or similar brands.

In the event of overpressure, gas may be emitted from the equalisation volume 64 and into the ambient atmosphere outside the equalisation casing 26, through the equalisation opening 84, and, if there is a negative pressure difference between the gas pressure in the equalisation volume 64 and that in the ambient atmosphere, gas may be drawn into the equalisation volume 64 by suction without there being any danger of moisture passing through the equalisation opening.

In the event that the liquid-impermeable material allows gas to pass in only one direction, a second equalisation opening 88 may be provided in the wall of the equalisation casing 26, passing through the latter, wherein this second equalisation opening may be covered by the same material 86 but in the opposite orientation by comparison with the first equalisation opening 84. In this way, gas may exit from the equalisation volume and into the ambient atmosphere through one of the equalisation openings 84 and 88 and may enter the equalisation volume 64 through the respectively other equalisation opening.

As a result of these measures, an excessive difference in pressure between the gas pressure in the interior of the air damper drive 12 and its ambient atmosphere may be avoided in both directions, which considerably reduces or even eliminates the risk of moisture and/or dirt being drawn in by suction during cooling phases, as was a risk in the prior art.

Although this is not illustrated in FIG. 2, the wall 26a of the equalisation casing 26 closest to the frame 14 in the assembled state may be formed by a section of the frame 14.

Figure 3:
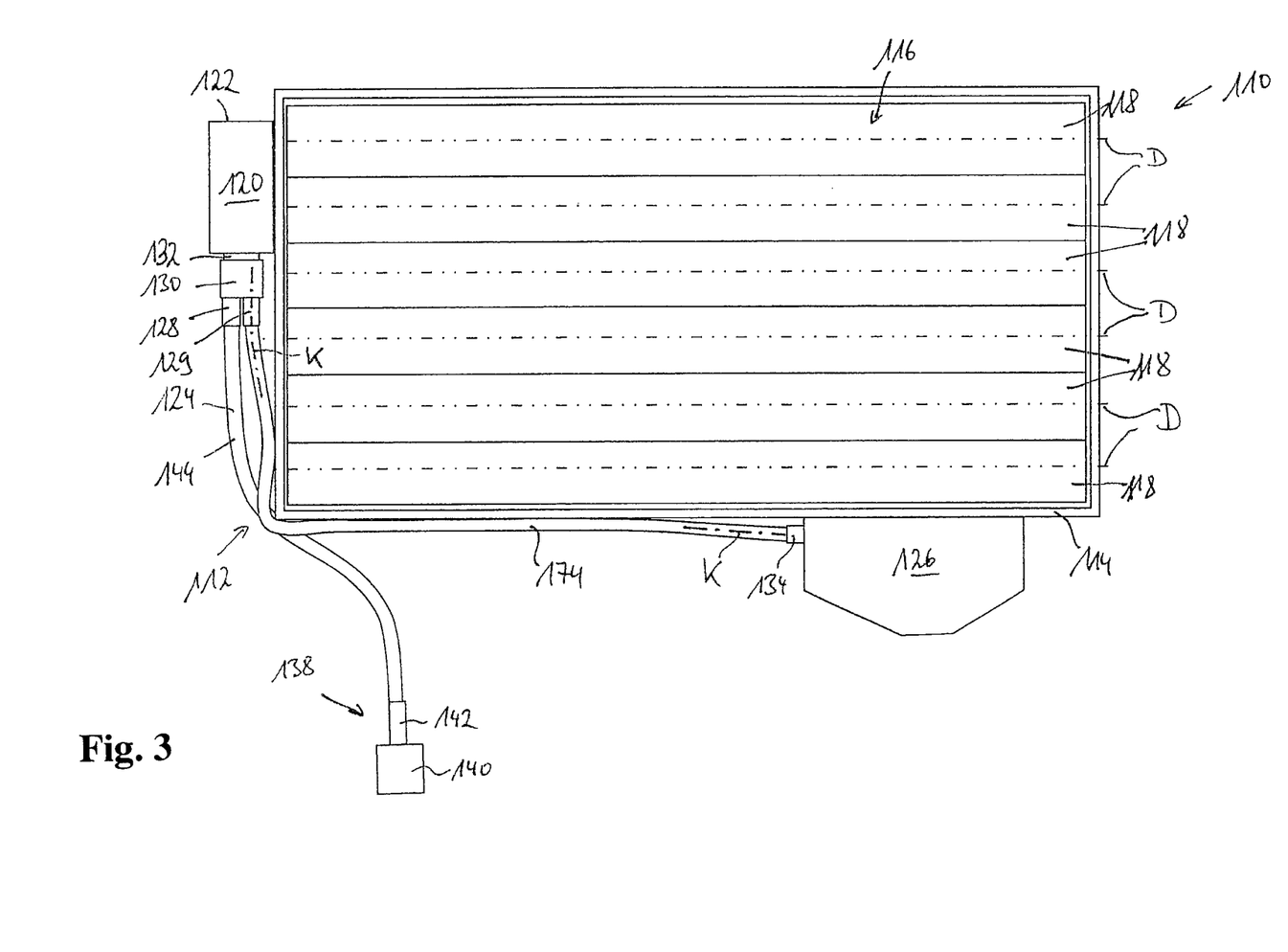
FIG. 3 shows a highly schematic view, corresponding to the perspective in FIG. 1, of a second embodiment of the present invention.

FIG. 3 illustrates a second embodiment of the present invention, in which like or functionally equivalent component parts or sections of component parts are provided with like reference numerals that are, however, incremented by 100. The second embodiment in FIGS. 3 and 4 is described below only where it differs from the first embodiment illustrated in FIGS. 1 and 2, to the description whereof the reader is otherwise expressly referred.

Figure 4:
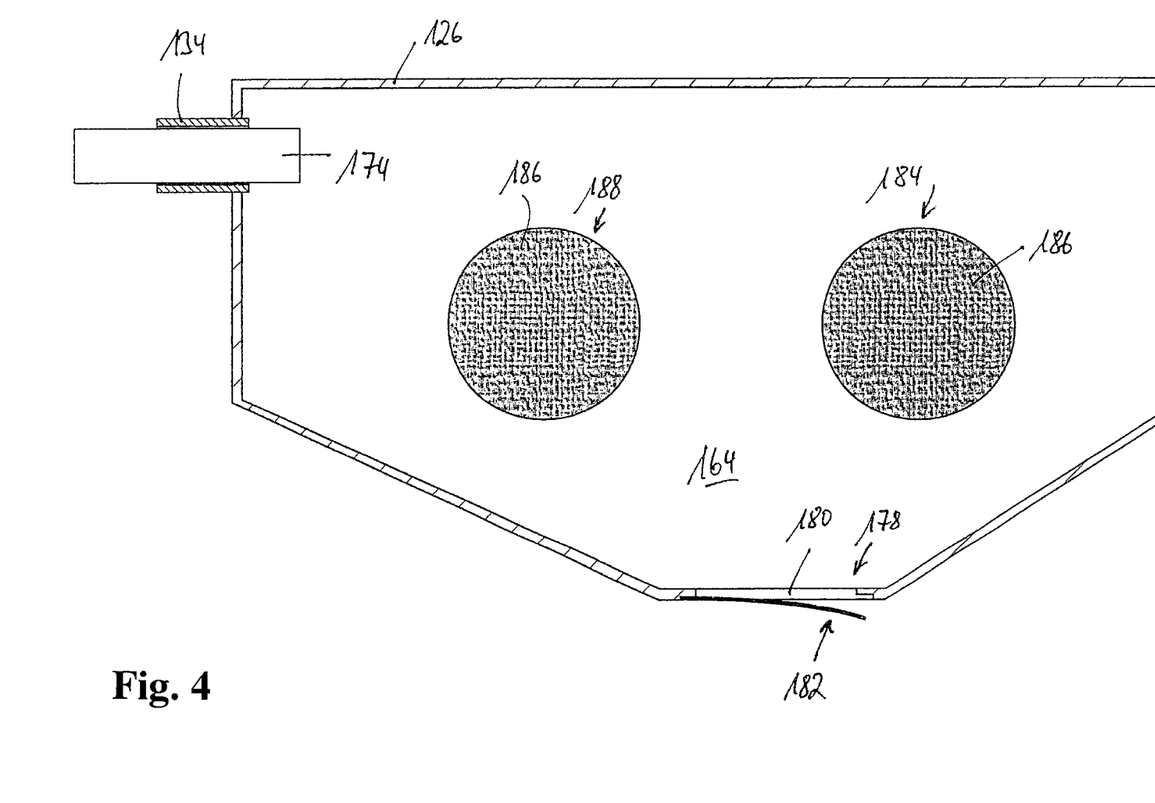
FIG. 4 shows a cross-sectional view, corresponding to the perspective in FIG. 2, through the equalisation casing in FIG. 3.

The second embodiment in FIGS. 3 and 4 differs primarily from the first embodiment in FIGS. 1 and 2 in that exclusively electrical lines are guided in the cladding 144 of the duct 124, while, for pressure equalisation, a hose 174 which is guided outside the cladding 144 is guided from the plug 130 into the equalisation casing 126.

For the liquid-tight connection of the hose 174 to the plug 130, the latter may be surrounded by a bushing 129 in a manner known per se, as is in principle also the case for the duct 124 and the bushing 128.

In FIG. 3, the duct 124 having the electrical lines is illustrated merely by way of example and may be constructed to be longer or shorter than illustrated in FIG. 3.

The advantage of the second embodiment in FIGS. 3 and 4 lies in the fact that the hose 174 may be constructed as a separate duct of sufficiently large diameter, which results in an advantageously reduced flow resistance. As a result, a pressure equalisation between the gas pressure in the interior of the actuator casing 122 and the gas pressure in the interior of the equalisation casing 126 may take place particularly quickly.

The hose 174 may for example have the same external and internal dimensions as the cladding 144, or may even have larger dimensions.

The equalisation casing 126 in the second embodiment differs from that in the first embodiment only in that it has only the inlet provided with the bushing 134 but has no further inlets or outlets, since it has no need of such.

FIG. 5 shows in highly schematic form a longitudinal section through the actuator casing 22 or 122. There may be provided therein a first space 90 or 190 in which for example control electronics for controlling an actuator motor (not illustrated in FIG. 5) in the second space 92 or 192 may be received. Any partition wall 22a, 122a present may have breaches 94, 194 through which not only may electrical and/or pneumatic lines be guided but which also make a fluid-mechanics connection between the two spaces 90, 190 and 92, 192.

Similarly, there may be provided in the wall 32a, 132a which partitions the socket 32, 132 from the actuator inner volume 66, 166 a venting hole 95, 195 which passes through the wall 32a, 132a and which may also serve as a passage hole 96, 196 for one or more contact electrodes 98, 198. A duct 24 or 174 that is connected by way of a plug 30, 130 to the actuator casing 22, 122 may connect the actuator inner volume 66, 166 to the equalisation volume 64, 164 through passage holes 95, 195 or 96, 196 of this kind.

An actuation member, such as an output shaft or a piston, may be guided out of the interior of the actuator casing 22, 122 by way of a lateral opening 99, 199 in the actuator casing 22, 122, for linking to a directly movement-driven air damper 18, 118. At this point, the actuator casing 22, 122 may be sealed from the ambient atmosphere by suitable sealing means which are known per se.

The invention claimed is:

1. An air damper drive (22; 122) for adjusting at least one air damper (18; 118), which is provided on a frame (14; 114) such that it is movable in relation thereto, between at least two different relative positions, in particular in a motor vehicle, including an actuator (20; 120) having an actuator casing (22; 122) and a movement output member received therein, and further including a duct (24; 74; 174) which is coupled or may be coupled in liquid-tight manner to the actuator (20; 120) and extends along a duct path (K) and has a duct sheath (46, 48, 50, 74; 174) and a duct volume surrounded by the latter, characterised in that the duct sheath (46, 48, 50, 74; 174) is coupled or may be coupled to the actuator casing (22; 122) in liquid-tight manner such that the duct volume communicates with an actuator inner volume (66; 166) that is surrounded by the actuator casing (22; 122), and in that the air damper drive (12; 112) has an equalization casing (26; 126) to which the duct sheath (46, 48, 50, 74; 174) is connected or may be connected in liquid-tight manner such that the duct volume communicates with an equalization volume (64; 164) that is surrounded by the equalization casing (26; 126), such that the duct (24, 74; 174) connects the actuator inner volume (66; 166) and the equalization volume (64; 164) in a fluid-mechanical manner.

2. An air damper drive according to claim 1, characterised in that the equalization casing (26; 126) has an equalization opening (84, 88; 184, 188) that is covered by a gas-permeable but liquid-impermeable material (86; 186), in particular textile.

3. An air damper drive according to claim 1, characterised in that the equalization casing (26; 126) has an overpressure valve (82; 182) which opens if a predetermined threshold pressure difference between an ambient atmospheric pressure outside the equalization casing (26; 126) and an operating pressure in the equalization volume (64; 164) is exceeded, and which closes if the pressure difference between the ambient atmospheric pressure and the operating pressure in the equalization volume (64; 164) is smaller than the threshold pressure difference.

4. An air damper drive according to claim 3, characterised in that the overpressure valve (82; 182) is provided at the geodetically lowest point (78; 178) of the equalization casing (26; 126).

5. An air damper drive according to claim 1, characterised in that the duct sheath (46, 48, 50, 74; 174) is a hose (46, 48, 50, 74; 174) containing a gas, in particular air.

6. An air damper drive according to claim 5, characterised in that an electrically conductive material (58, 60, 62) is received in the duct volume, wherein the hose (46, 48, 50, 74; 174) is preferably an electrical insulation that insulates the electrically conductive material (58, 60, 62).

7. An air damper drive according to claim 1, characterised in that the duct (46, 68, 50, 74; 174) ends at or in the equalization casing.

8. An air damper drive according to claim 1, characterised in that the duct (24) passes through the equalization casing (26), wherein both the point (at 34) at which the duct (24) enters the equalization casing (26) and the point (at 36) at which the duct (24) exits from the equalization casing (26) are sealed from the surrounding environment in liquid-tight manner, and wherein further the duct sheath (46, 48, 50) has in the interior of the equalization casing (26) a breach (68, 76, 78) passing through it.

9. An air damper drive according to claim 1, characterised in that it has a plurality of electrical lines (52, 54, 56), each of which is provided with insulation.

10. An air damper drive according to claim 9, characterised in that the plurality of electrical lines (52, 54, 56) is received in a common cladding (44) that surrounds the lines (52, 54, 56).

11. An air damper drive according to claim 9, characterised in that the plurality of electrical lines (52, 54, 56) is coupled by means of a common electrical plug (30; 130) to a corresponding socket (32; 132) on the actuator casing (22; 122).

12. An air damper drive according to claim 11, characterised in that the socket (32; 132) has more electrical contacts (98; 198) than there are electrical lines (52, 54, 56) leading away from the common socket (30; 130).

13. An air damper device (10; 110) having an air damper drive (12; 112) according to claim 1, and having a frame (14; 114) and at least one air damper (18; 118) which is provided on the frame (14; 114) movably in relation thereto, characterised in that the equalization casing (26; 126) is provided on the frame (14; 114), and preferably in that a section of the frame (14; 114) is part of the equalization casing (26; 126).

14. A motor vehicle having an air damper drive (12; 112) according to claim 1, and having a frame (14; 114) and at least one air damper (18; 118) which is provided on the frame (14; 114) movably in relation thereto.

15. A motor vehicle having an air damper drive according to claim 1, and having a frame and at least one air damper which is provide on the frame movably in relation thereto, wherein the air damper is characterized in that the equalization casing (26; 126) is provided on the frame (14; 114), and preferably in that a section of the frame (14; 114) is part of the equalization casing (26; 126).

* * * * *

UNITED STATES PATENT AND TRADEMARK OFFICE
CERTIFICATE OF CORRECTION

Page 1 of 1

PATENT NO. : 9,493,053 B2
APPLICATION NO. : 13/950498
DATED : November 15, 2016
INVENTOR(S) : Domenico Solazzo It is certified that error appears in the above-identified patent and that said Letters Patent is hereby corrected as shown below:

On the Title Page

Item (71), under Applicant: "ROECHLING AUTOMOTIVE AG & CO. KG, Mannheim (DE)" should read as -- ROECHLING AUTOMOTIVE SE & CO. KG, Mannheim (DE) --.

Signed and Sealed this
Second Day of January, 2018

Joseph Matal
*Performing the Functions and Duties of the*
*Under Secretary of Commerce for Intellectual Property and*
*Director of the United States Patent and Trademark Office*